Patented July 20, 1937

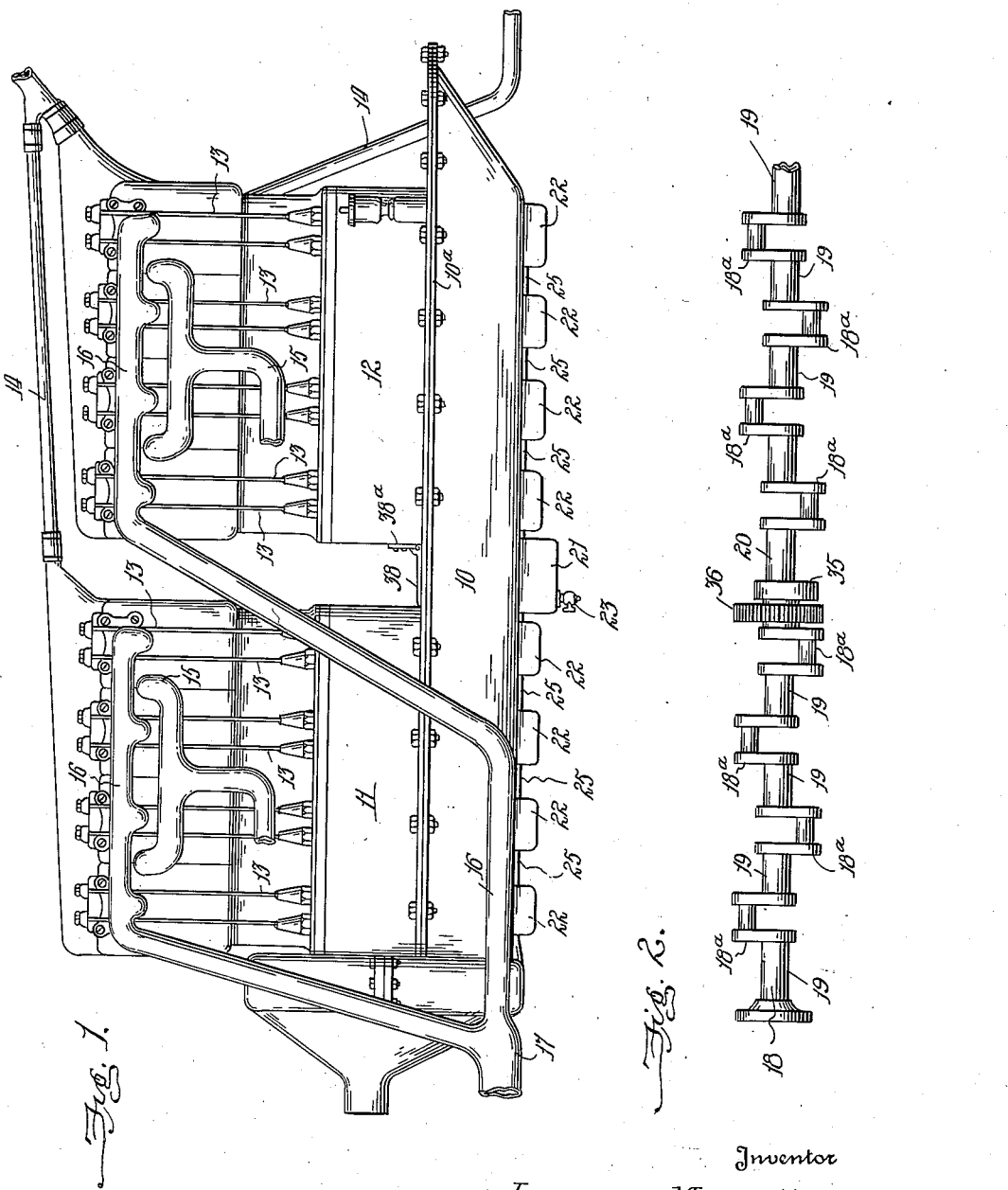

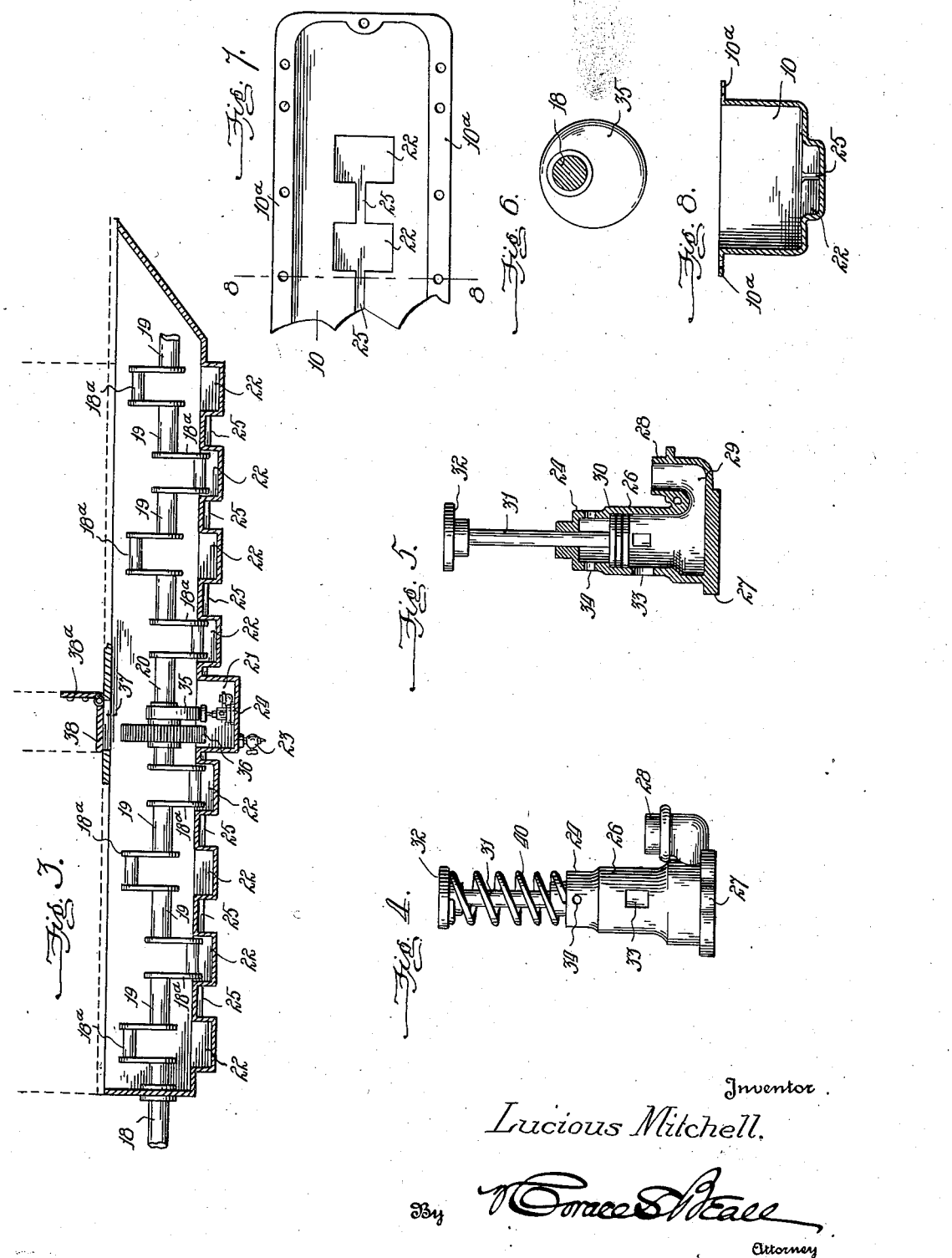

2,087,696

UNITED STATES PATENT OFFICE 2,087,696

AUTOMOBILE ENGINE

Lucious Mitchell, Auburn, Ala.

Refiled for abandoned application Serial No. 407,206, November 14, 1929. This application September 23, 1936, Serial No. 102,240

1 Claim. (Cl. 184—13)

My invention relates to automobiles and is more especially an improvement in the operating mechanism of the driving engine with particular reference to the formation of the crank case in connection with a pump for increasing the circulation of the oil in the oil pan as applied to the crankshaft and contiguous parts of the engine.

The primary object of my invention is to provide an improved form of oil pan for the lower part of the crank casing whereby a more effective lubrication of the crankshaft and contiguous parts of the engine is produced in carrying out the splash system, a particular form of pump being used in connection with the oil pan.

With this principal object in view my invention consists in providing an oil pan for the crank case of an automobile engine with a deep central well or sump below the main bearing of the crankshaft, and with shallow wells below the crank arms and into which the ends of the crank arms dip for picking up a supply of oil for lubrication of the parts, in connection with a particular construction of pump located in the sump and operated by a cam on the crankshaft, the arrangement being especially adapted for use in connection with two spaced apart motor blocks and a solid crankshaft having six main bearings with a cam for operating the pump adjacent the center bearing; all as hereinafter fully described and specifically set forth in the appended claim.

In the drawings:

Figure 1 is a side elevation of an eight-cylinder engine for automobiles showing my improvements applied thereto.

Fig. 2 is a side elevation of the solid crankshaft illustrating the bearings and location of the operating parts with respect to the main bearing portion of the shaft.

Fig. 3 is a longitudinal sectional view through the oil pan of the crank case, showing the formation of the bottom of the pan and operation of the crankshaft and pump.

Fig. 4 is an elevation of the pump.

Fig. 5 is a sectional view through the pump.

Fig. 6 is a detail side view of the cam for operating the pump.

Fig. 7 is a fragmental plan view showing a modification of the pan, and

Fig. 8 is a transverse sectional view on the line 8—8 of Fig. 7.

My invention is applied to an automobile engine illustrated in Fig. 1 of the drawings, in which pan 10 is bolted to the lower part of two engine blocks 11 and 12 spaced apart and each having four cylinders with the usual valve rods 13, water connections 14, manifold intake pipes 15, 15, and exhaust pipes 16, 16, from the engine blocks, the exhaust pipes being connected to a manifold exhaust pipe 17. The crankshaft 18 is, in the present instance, formed solid to provide the cranks, 18a, and intermediate bearings 19 and 20, the bearing portion 20 of the shaft being at the center thereof and said shaft supported from the engine blocks in the usual manner by hangers (not shown). The center bearing portion 20 is longer than the others and is located below the space between the engine blocks, for the purpose hereinafter set forth.

The oil pan 10 is of a particular construction, that is to say, the bottom of the same is provided with a deep well or sump 21 below the bearing portion 20 of the crankshaft, and with shallow wells or depressions 22 below the cranks and located with respect to said cranks so that they will dip therein in the operation of the crankshaft, said sump and wells, 21 and 22, being preferably stamped from the material of which the pan is formed. The bottom of the sump is provided with a drain cock 23, and in order that the wells may drain into the sump narrow channels 25 connect all the wells to each other and to the sump. As shown in the modification, Fig. 7, the channels may be as deep as the wells, but inasmuch as these wells are shallow only a small quantity of oil will remain in the same in draining the oil pan even if the connecting channels are shallow, as indicated in Figs. 1 and 3. The oil pan is provided at its upper edge with outwardly projecting flanges 10a for attachment to the corresponding flanges on the lower ends of the engine blocks.

For the purpose of spraying oil in the pan to effect better lubrication of the engine parts I employ a pump 24 located in the sump and of the construction illustrated in Figs. 4 and 5 comprising a cylindrical pump casing 26 with a flange base 27 for securing it in place and with a nozzle 28 at one side connected to the outlet 29 of the casing or pump cylinder, in which latter works a piston 30 having a stem 31 projecting through the top of the casing. The piston is reciprocated in one direction, or upwardly, by means of a helical spring 40 encircling the stem and interposed between the top of the casing and a head 32 formed on the upper end of said stem, and oil enters the cylinder through holes 33 in the sides of the casing immediately below the piston when at the limit of its upward stroke, while additional holes 34 are in the upper part of said cylinder for augmenting the supply of oil above the piston on its downward stroke.

The pump 24 is actuated against the action of the spring by means of a cam 35 fixed to the center bearing 20 of the crankshaft alongside of a gearwheel 36 which operates the timing mechanism, and in order to gain access to the pump for examination, etc., there is an opening 37 between the engine blocks protected by a cover or lid 38, the attaching plate 38a of which is secured to one of said engine blocks.

From the foregoing description, in connection with the accompanying drawings, it will be apparent that the particular construction of oil pan is such that the oil will properly lubricate the bearings by which the piston rods are connected to the crankshaft, as well as the bearing portions of the crankshaft itself, and that the particular construction of the pump including the manner of operating the same from the crankshaft provides for distributing the oil in the pan for a more effective lubrication. Furthermore, by connecting the shallow wells in which the cranks operate to the sump, shown in Fig. 7, all of the oil can be drained from the pan through the drain-cock by way of the sump, inasmuch as said cock discharges from the bottom of the sump which is lower than the bottom of the shallow wells. It will be understood of course that the shape of the different wells, including the sump, may be changed, and that other modifications may be resorted to without departing from the spirit and scope of my claim.

This case is refiled for the abandoned application 407,206 filed Nov. 14, 1929.

I claim:—

In combination with an automobile engine having engine-blocks spaced apart from each other and a crankshaft below the same, of an oil pan in which the crankshaft operates, a sump at the center of the pan, shallow wells in the bottom of the pan at each side of the sump below the cranks of the shaft and in which said cranks dip, and narrow channels connecting the shallow wells with each other and with the sump; together with an oil pump mounted on the bottom of the sump, means on the crankshaft for operating said oil pump, and a covered opening between the engine-blocks leading to the main bearing portion of the shaft and to the sump below the same.

LUCIOUS MITCHELL.